Dec. 15, 1953  C. F. MARSCHNER  2,662,260
RAPID CONNECT AND DISCONNECT FASTENING MEANS
Filed Oct. 13, 1950
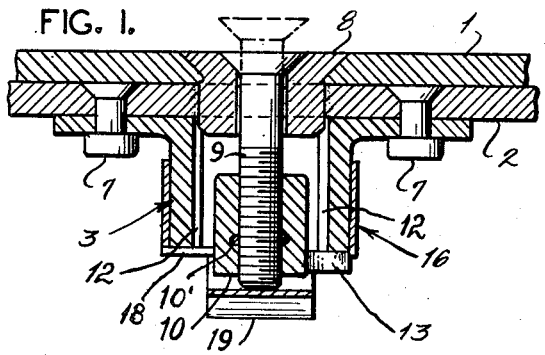
FIG. 1.
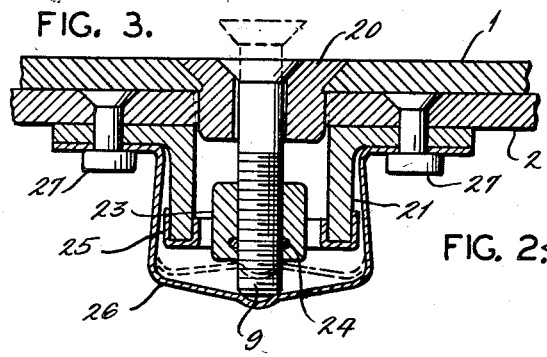
FIG. 3.
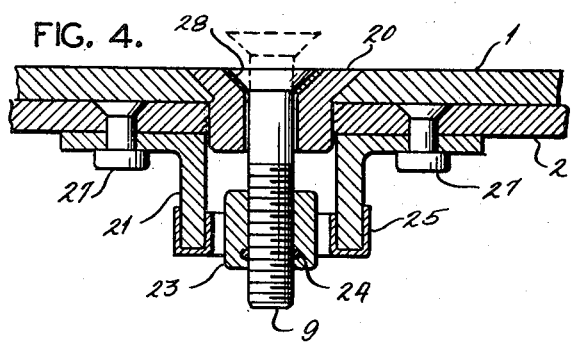
FIG. 4.
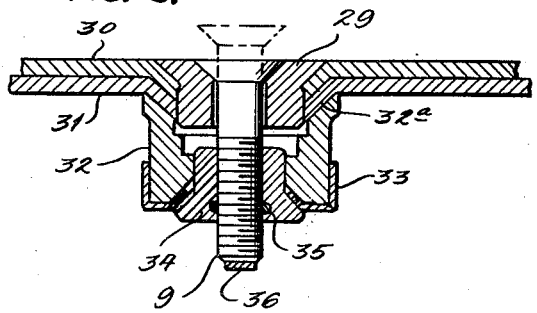
FIG. 5.
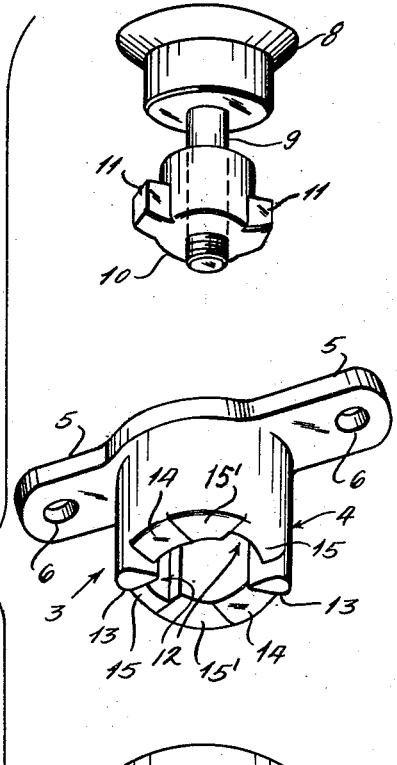
FIG. 2.
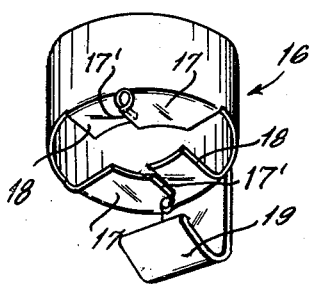
INVENTOR.
CHARLES F. MARSCHNER
BY
Carr & Carr & Gravely,
ATTORNEYS.

Patented Dec. 15, 1953

2,662,260

UNITED STATES PATENT OFFICE 2,662,260

RAPID CONNECT AND DISCONNECT FASTENING MEANS

Charles F. Marschner, Normandy, Mo., assignor to McDonnell Aircraft Corporation, St. Louis, Mo., a corporation of Maryland Application October 13, 1950, Serial No. 189,942

7 Claims. (Cl. 24—221)

This invention relates to fastening means and is more particularly directed to a fastening means that can be used to rapidly connect and disconnect parts to which elements of the fastener are attached.

One object of the invention is to provide a positive fastening means for aircraft structural parts capable of withstanding both shear and tension loads and which can be readily installed on the parts to which it is secured.

Another object of the invention is to provide a rapid operating fastening means capable of withstanding both shear and tension loads.

The invention consists in the provision of an assembly of elements comprising a receptacle mounted on one portion of the structure being joined, the receptacle having a cap provided with deformed portions for positioning a nut therein that is to be applied to a screw and a bushing mounted on the other portion of the structure being joined, the receptacle cap being provided with a spring-like arm for dislodging the nut and screw from the receptacle after the nut has been placed in position for separation from the receptacle.

In the drawings:

Fig. 1 is a sectional assembly view of the preferred form of the invention,

Fig. 2 is an exploded view thereof,

Fig. 3 is a sectional view of a modified form of the invention,

Fig. 4 is a sectional view of another modified form of the invention; and

Fig. 5 is a sectional view of a further modification of the invention.

The invention is embodied in the fastener structure set forth in Figs. 1 and 2 of the drawings in which the numerals 1 and 2 designate plate members to be fastened together. This fastener is capable of rapid attachment and disassembly and includes a receptacle 3 comprising a tubular member 4 provided with ears 5. The ears have apertures 6 therein for receiving rivets 7 extending through plate member 2. The plate members 1 and 2 are bored for receiving a bushing 8 aligned with the receptacle 3.

A screw 9 extends through the bushing and the receptacle, the screw having a flat head fitting in a countersunk hole in the bushing 8. The screw 9 has a nut 10 threaded thereon and provided with diametrically disposed projections 11. The nut 10 is also provided with a friction element 10'. These projections move axially in the slots 12 of the receptacle and extend beyond the lower end thereof in the position of the fastener when members 1 and 2 are assembled. The bottom of the receptacle is provided with depending stops 13 whose sides are substantially radial to the tubular member 4. Diametrically disposed and adjacent to the stops are surfaces 14 which are horizontal or normal to the longitudinal axis of member 4, and on the opposite sides of the stops are other surfaces 15 also horizontal or normal to the said axis of member 4. The surfaces 14 and 15 are at different axial heights and a sloping surface 15' connects them. Surface 14 constitutes abutments for projections 11 after projections 11 have passed through axial slots 12 and have been rotated relative to the receptacle 3. The stops 13 limit rotational movement of the nut relative to receptacle 3.

Undesirable motion of the nut 10 with screw 9 is prevented by a latching spring 16, which spring is in the form of a cap provided with integral radial portions 17. Adjacent each of the spring portions 17 are other immediately adjacent portions 18. The portions 17 are twisted to form inclined planes relative to surfaces 14 and 15, so that one radial edge 17 of each is disposed below the adjacent radial edge of the immediately adjacent portions 18, the opposite edge projecting above the level of the said radial portions 18. This cap is fitted upwardly over the lower end of receptacle 3 so that the portions 17 are disposed below the sloping surface 15' thereof, and portions 18 are disposed below the surfaces 14. The radial edges 17' extending below the plane of surfaces 14 prevent relative motion of nut 10 after the projections 11 have been seated on radial portions 18. Thereafter, when the screw 9 is rotated, the plate members 1 and 2 may be clamped or unclamped, depending upon the direction of rotation of the screw 9. When the nut 10 has been moved relative to screw 9, during the unclamping operation, so that projections 11 clear the radial edges 17' of spring portions 17, the nut rotates (clockwise as viewed in Fig. 2) with the screw until the projections 11 strike stops 13 and, thus, are in alignment with slots 12 after which the plate members 1 and 2 may be radially separated or disassembled. The screw 9 is forced axially through the bore in bushing 8 by a leaf spring 19, integral with cap 16, bearing against the threaded end of the screw. The screw is rapidly assembled and disassembled from the receptacle 3 with plate member 1 which also carries the bushing 8, as by staking around the tapered head thereof (Fig. 1). This bushing provides a high shear strength for the fastening device and screws 9 may be of such size as to provide the necessary high tensile strength. These high strength factors are combined with rapid action so that aircraft compartment closures may be rapidly attached to and detached therefrom.

A modified form of the invention is illustrated in Fig. 3 in which bushing 20 and a receptacle 21 are constructed in the same manner as the bushing 8 and receptacle 3 above described. A screw 9 extends through the bushing and the receptacle and is provided with a nut 23 constructed in the same manner as the nut 10. This nut is provided with a locking ring 24 like that at 10' in Fig. 1, and a latching spring 25 is fitted over the lower end of the receptacle 21. Coaction between these parts is the same as that described above.

A U-shaped spring 26 is fastened by rivets 27 which hold the receptacle on the plate member 2. The spring bears against the threaded end of the screw 9, moving it axially of the bushing and receptacle after the nut 23 has been released from the abutment surface on receptacle 21.

Fig. 4 shows another modification which is constructed similarly to that illustrated in Fig. 3. The spring 26 of the Fig. 3 device is replaced by a spring 28 positioned between the head of screw 9 and the bushing 20. This spring is constructed similarly to a conventional lock washer and moves the screw 9 axially of the bushing and the receptacle after the nut has been released from the abutment surface on receptacle 21.

Another modified form of the invention is illustrated in Fig. 5 in which a bushing 29 is disposed in apertures bored in plates 30 and 31. The plates adjacent the bushing are dimpled and held in this position by a correspondingly shaped inner surface 32a of the receptacle 32. The lower end of this receptacle is provided with a latching spring 33, and a nut 34 is provided with a polygonal projection received in the correspondingly shaped aperture in receptacle 32. The nut 34 is provided with a locking ring 35, relative axial motion of the screw and the plates being produced by a leaf spring 36 secured to the latching spring 33. The operation of this device is identical to that described in connection with Figs. 1 and 2.

The fasteners described above have a high shear strength and a high tensile strength and a minimum of deflection when subjected to a shear load or a tension load. The fastener requires only a minimum of work in drilling and assembling the parts to be joined. Standard tools can be employed for applying the fastener and, therefore, it is capable of standardization. The fastener contains an element for disassembly after the screw has been loosened. The fastener is particularly applicable to shear loads to which most aircraft closures are subjected, but in addition will take the higher tension loads resulting from air loads and from axial cocking of the fastener when under shear loads. The fastener enables aircraft closures to be removed from and applied to the fuselage or other openings in a small fraction of the time now required therefor. Various thicknesses of sheet metal can be clamped by substituting a different length screw and bushing, all other parts remaining the same.

Throughout the description, frequent reference has been made to "above" and "below" in relation to the parts of the fastener. These terms have been applied as the device appears in Fig. 1 with the plate 1 being above and spring 19 being below, but it is obvious that these terms are only relative and should not be restrictive, inasmuch as the physical position of the fastener may be changed to suit assembly conditions.

What I claim is:

1. A fastener comprising a receptacle to be secured to supporting means, stops on said receptacle, a bushing to be fitted into a bore in the members secured together and snugly engaging the walls thereof, a screw extending through said bushing and said receptacle, a nut for said screw, a cap for said receptacle having radial projections whose sides are disposed in different planes, projections on said nut adapted to be held in position between said stops and the sides of said radial projections; and a spring disposed for axially moving said screw in said bushing and receptacle.

2. A fastener comprising a receptacle securable to one of two members to be clamped together, a bushing retained in the other of the members, the members having apertures in alignment to receive said bushing, nut stops on said receptacle, a screw extending through said bushing and said receptacle, a nut for said screw, projections on said nut, means mounted on said receptacle including yieldable portions cooperating with said stops for preventing rotational movement of said nut when said nut is seated between said stops and yieldable portions; and means mounted on said last mentioned means for axially moving said screw relative to said bushing and receptacle when the nut is in position for removal through the receptacle.

3. A fastener comprising a tubular receptacle to be secured to one of two bored members to be clamped together and having an axial slot therein, a bushing snugly received in the bores in said members, nut stops on said receptacle, abutments on said receptacle, a screw received in said bushing and receptacle, a nut for said screw, projections on said nut slidably received in said axial slot, said nut and screw adapted to pass through said receptacle while being rotated relative thereto in order to bring the nut projections against said stops, a cap for said receptacle having radial portions therein disposed in different planes for holding said nut projections against said receptacle abutments; and a spring secured to said cap for moving said screw and nut axially through said receptacle in order to separate said clamped members.

4. A fastener comprising a tubular receptacle to be secured to one of two members having bores therein and that are to be clamped together and having axial slots therein, a pair of diametrically disposed nut stops mounted on one end of said receptacle, an abutment disposed adjacent each stop and diametrically disposed with respect to the receptacle, a bushing in said members snugly fitting the bores therein, a cap for said receptacle having radial projections whose edges are disposed adjacent said abutments in different planes, a screw in said bushing and receptacle, a nut for said screw, projections on said nut slidably received in said axial slots normally held in position between said stops and edges for preventing rotation thereof, said screw and nut rotating as a unit when the nut has been lifted off said abutment; and a leaf spring secured to said cap for moving said screw and nut axially through said receptacle for indicating that the fastener is unlocked.

5. A fastener comprising a tubular receptacle to be secured to one of two members having aligned bores and that are to be clamped together and having axial slots therein, a pair of diametrically disposed nut stops mounted on one end of said receptacle, an abutment disposed adjacent each stop and diametrically disposed with respect to the receptacle, a bushing snugly received in the bores in said members, a cap for said receptacle having radial projections whose edges are disposed adjacent said abutments in different planes, a screw in said bushing and receptacle, a nut for said screw, projections on said nut slidably received in said axial slots normally held in position between said stops and edges for preventing rotation thereof, said screw and nut rotating as a unit when the nut has been lifted off said abutment; and a U-shaped spring secured to said member having the receptacle thereon engageable with said screw for movement thereof axially of said receptacle and bushing.

6. A fastener comprising a tubular receptacle to be secured to one of two members having aligned bores therein and that are to be clamped together and having axial slots therein, a pair of diametrically disposed nut stops mounted on one end of said receptacle, an abutment disposed adjacent each stop and diametrically disposed with respect to the receptacle, a bushing snugly fitting the bore sides in said members, a cap for said receptacle having radial projections whose edges are disposed adjacent said abutments in different planes, a screw in said bushing and receptacle, a nut for said screw, projections on said nut slidably received in said axial slots normally held in position between said stops and edges for preventing rotation thereof, said screw and nut rotating as a unit when the nut has been lifted off said abutment; and a spring disposed between said screw and bushing for moving said screw and nut axially.

7. A fastener comprising a receptacle securable to one of two members to be held together and quickly separable, said receptacle having diametrically opposite slots opening therethrough, a bushing retained in the other of the members, stop means adjacent said receptacle slots, a screw extending through said bushing and said receptacle, a nut threaded on said screw, diametrically opposite projections on said nut adapted to pass into said receptacle slots, cap means on said receptacle having radially inwardly directed, diametrically opposite, yieldable projections cooperating with and located between said stop means, said yieldable projections and stop means holding said nut projections to prevent nut rotation with said screw, and friction means between said nut and screw to constrain said nut to rotate with said screw when said nut projections are free of said stop means and yieldable projections.

CHARLES F. MARSCHNER.

References Cited in the file of this patent

UNITED STATES PATENTS

| Number | Name | Date |
|---|---|---|
| 2,059,271 | Swanstrom | Oct. 12, 1937 |
| 2,186,747 | Albin | Jan. 9, 1940 |
| 2,327,555 | Purinton | Aug. 24, 1943 |
| 2,350,498 | Dick | June 6, 1944 |
| 2,368,713 | Kane | Feb. 6, 1945 |
| 2,401,184 | Poupitch | May 28, 1946 |
| 2,479,402 | Powell | Aug. 16, 1949 |
| 2,479,992 | Woods | Aug. 23, 1949 |